US010604198B2

(12) United States Patent
Escoffier et al.

(10) Patent No.: US 10,604,198 B2
(45) Date of Patent: Mar. 31, 2020

(54) MOTOR VEHICLE SPOILER WITH REAR SCREEN CLEANING DEVICE

(71) Applicant: Compagnie Plastic Omnium, Lyons (FR)

(72) Inventors: Arnaud Escoffier, Lyons (FR); Bertrand Hache, Saint Cyr (FR); Philippe Coudron, Caluire et Cuire (FR); Pascal Depardon, Meximieux (FR); Pascal Barbier, Oyonnax (FR)

(73) Assignee: Compagnie Plastic Omnium (FR)

( * ) Notice: Subject to any disclaimer, the term of this patent is extended or adjusted under 35 U.S.C. 154(b) by 92 days.

(21) Appl. No.: 15/760,142

(22) PCT Filed: Sep. 14, 2016

(86) PCT No.: PCT/FR2016/052318
§ 371 (c)(1),
(2) Date: Mar. 14, 2018

(87) PCT Pub. No.: WO2017/046518
PCT Pub. Date: Mar. 23, 2017

(65) Prior Publication Data
US 2018/0251166 A1 Sep. 6, 2018

(30) Foreign Application Priority Data
Sep. 14, 2015 (FR) ...................................... 15 58528

(51) Int. Cl.
B62D 37/02 (2006.01)
B62D 35/00 (2006.01)

(52) U.S. Cl.
CPC ........... *B62D 37/02* (2013.01); *B62D 35/007* (2013.01); *Y02T 10/82* (2013.01)

(58) Field of Classification Search
CPC ........ B62D 37/02; B62D 35/007; Y02T 10/82
See application file for complete search history.

(56) References Cited

U.S. PATENT DOCUMENTS

| 4,603,898 A | 8/1986 | Udagawa et al. | |
| 8,172,307 B2 * | 5/2012 | Froeschle | B60J 1/2008 296/180.1 |
| 2010/0090497 A1 * | 4/2010 | Beckon | B60Q 1/2661 296/180.5 |

FOREIGN PATENT DOCUMENTS

| DE | 3520971 A1 * | 9/1986 | ........... B62D 35/007 |
| EP | 2711254 A2 | 3/2014 | |
| FR | 2890638 A3 | 3/2007 | |
| JP | S61175071 U | 10/1986 | |

(Continued)

Primary Examiner — Lori L Lyjak
(74) Attorney, Agent, or Firm — St. Onge Steward Johnston & Reens, LLC

(57) ABSTRACT

Motor vehicle spoiler intended to be positioned in a region of a rear edge of a roof above a rear screen, the spoiler including an upper face substantially aligned with an imaginary continuation of a stream line of the roof, and at least one through-opening that opens above a region of the rear screen, the opening being equipped with at least one internal wall designed to channel a stream of air coming from the roof over the region through the opening, characterized in that the wall is mounted with the ability to move with respect to the spoiler so as to be able to open towards the rear screen to channel the air stream over the region and so as to be able to close off the opening in a closed position.

11 Claims, 2 Drawing Sheets

(56) References Cited

FOREIGN PATENT DOCUMENTS

| KR | 20090036065 A | * | 4/2009 | ............ | B62D 35/001 |
| WO | WO-2013099809 A1 | * | 7/2013 | ............ | B62D 35/007 |

* cited by examiner

MOTOR VEHICLE SPOILER WITH REAR SCREEN CLEANING DEVICE

FIELD OF THE INVENTION

The present invention concerns the field of motor vehicles and more specifically the field of motor vehicle spoilers that include a rear window cleaning device.

BACKGROUND OF THE INVENTION

A spoiler is a bodywork part forming an extension of the roof that is positioned on the rear of a vehicle and that is designed to improve the aerodynamics (at the rear) of the vehicle on which said part is assembled. Spoilers are also used to enhance the esthetic aspects (style) of the vehicle. Spoilers are positioned at and attached to the top rear of the vehicle between the roof and the upper edge of the rear window, on the roof or on the tailgate.

Certain spoilers also have devices for cleaning the rear window.

Conventionally, rain and dirt are usually removed from the rear window using the rear window wiper and the rear window washer. Unfortunately, rear window wipers and rear window washers tend to be fragile, costly and liable to damage. Moreover, rear window wipers and rear window washers are used much less than front windscreen wipers and front windscreen washers.

For this reason, some spoilers are designed to direct a portion of the air flowing from the front to the rear of the vehicle along the upper surface of the roof panel, directly over the rear window. Consequently, dirt (rain, mud, dust, etc.) is blown away from the rear window.

A movable spoiler arranged in a region of a rear edge of the roof above a rear window is known. This spoiler is movable in that the angle between the spoiler and the roof can be adjusted as a function of the weather conditions. Thus, when it is raining, the spoiler is inclined to form an inclined section in which the raised portion is on the upstream side of the flow. This inclined section thus opposes the air flow and orients same onto the rear window via a space formed between the spoiler and the rear window.

Thus, the air flowing from the front to the rear of the vehicle is blocked by the wall of the spoiler before being directed in a substantially opposite direction.

This type of spoiler thus provides a solution that has a very negative effect on the overall aerodynamic performance of the vehicle.

A spoiler that is static in relation to the vehicle including a movable flap is also known, for example from document EP2711254A2. The movable flap projects from the upper surface of the spoiler and the degree of projection (projection height) increases when the speed of the vehicle drops in order to clean the rear window. Conversely, the degree of projection is reduced as the speed increases, to limit the negative aerodynamic effect.

This type of spoiler, despite providing enhanced aerodynamic performance compared to an entirely movable spoiler, nonetheless provides a solution that is disadvantageous in terms of aerodynamic performance. This is especially true because the movable flap, which is under constant pressure, needs to be reinforced and therefore made heavier to withstand such aerodynamic loads.

Thus, the known systems for cleaning rear windows include a member projecting from the surface extending the roof in order to capture the air flowing along the roof and to redirect same onto the rear window. However, these members have a negative effect on the aerodynamics of the vehicle, in particular at high speeds.

Systems that do not have any movable elements are also known. These devices have a permanent through-opening (formed through the thickness Z of the spoiler) opening out above the rear window, this opening being designed to (passively) allow a portion of the air flow coming from the roof towards the rear window to pass through the opening. "Opening" means a channel having an inlet and an outlet in the thickness (Z) of the spoiler. Thus, the air coming from the roof passively enters the inlet of the channel, then flows through the channel, and finally leaves the channel through the outlet thereof, opposite the rear window.

However, such an opening can have a negative effect on the aerodynamics of the vehicle, notably at high speeds, where aerodynamics are optimum with no diversion of the air, since it is often necessary to direct all of the air coming from the roof towards the rear of the vehicle. Furthermore, the diversion of the path of the air caused by the opening causes noise at certain speeds. These acoustic disturbances can cause discomfort to the driver and passengers, as well as to people outside the vehicle. Such noise may indeed cause noise pollution affecting dwellings located near to high-speed roads.

SUMMARY OF THE INVENTION

The invention is intended to overcome these drawbacks by proposing a spoiler that is designed to enable, under certain speed and weather conditions, a portion of the air flowing from the front towards the rear of the vehicle along the upper surface of the roof panel to flow directly onto the rear window, while enabling improved aerodynamic and acoustic performance of the car under other driving conditions. The invention achieves this by providing the spoiler with an opening provided with a movable wall that enables the opening to be closed and that opens downwards in order to passively direct the air coming from the roof onto the rear window.

Thus, the subject matter of the invention concerns a motor-vehicle spoiler that is designed to be arranged in a region of a rear edge of the roof above a rear window, said spoiler having and upper surface that is substantially aligned with an imaginary continuation of an air flow path from the roof, and at least one through-opening opening out above a region of the rear window, said opening being provided with at least one inner wall that is designed to channel an air flow coming from the roof onto the region through the opening. According to the invention, the wall is mounted movably in relation to the spoiler such that same can be opened towards the rear window to channel the air flow onto the region, and such that the opening can be closed off in a closed position.

Advantageously, the movable wall can be designed to close off the opening such that an upper surface of the movable wall is flush with the upper surface of the spoiler.

According to the invention, the spoiler may include actuating means designed to move the movable wall, the actuating means being positioned beneath the upper surface of the spoiler.

The movable wall is preferably mounted moveably in rotation about an axis oriented transversely in relation to the vehicle when the spoiler is mounted on the vehicle. In this case, the actuating means and the axis of rotation are advantageously located beneath the upper surface of the spoiler.

Advantageously, the axis of rotation can be located upstream of the opening so as to enable a pivoting of the movable wall that opens or closes the opening, without the movable wall projecting from the upper surface of the spoiler. Thus, the movable wall can be designed to pivot about the axis between at least two positions:

- an open position in which the movable wall is oriented towards the rear window, with an orientation enabling the air passing through the opening to be directed onto the region of the rear window;
- a closed position in which the movable wall closes the opening, being substantially aligned with an imaginary continuation of the flow path from the roof and flush with the upper surface of the spoiler.

The movable wall can also have a position raised in relation to the closed position, in which the movable wall forms an inclined plane projecting from the upper surface of the spoiler, a downstream portion of the wall being higher than an upstream portion.

Preferably, the region is the rear-view region of the vehicle.

The spoiler according to the invention can have several openings and can include a fascia providing the spoiler with an external appearance, and a strengthening element for the fascia that is attached to the fascia, the strengthening element being designed to form a hollow body once attached to the vehicle, in which the actuating means is seated.

Finally, according to the invention, the fascia and/or the strengthening element is preferably made of thermoplastic material.

BRIEF DESCRIPTION OF THE DRAWINGS

The invention can be better understood from the attached figures, which are provided by way of example and are in no way limiting, in which.

DETAILED DESCRIPTION OF THE INVENTION

Figure 1:
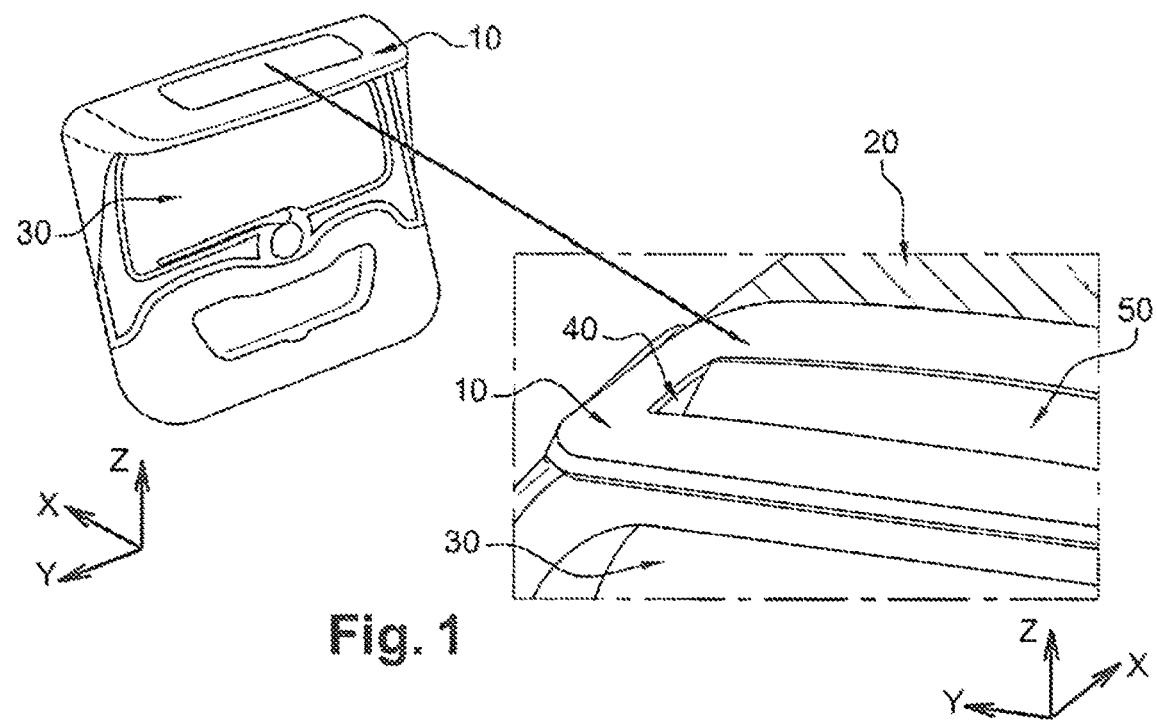
FIG. 1 shows an example spoiler according to the invention.
Figure 2:
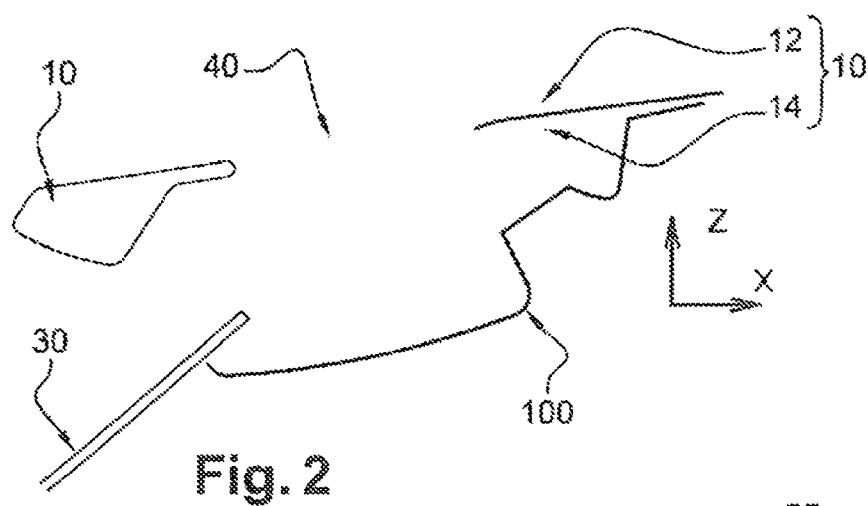
FIG. 2 is a diagram of a section (Y0) of a spoiler according to the invention with no movable wall.

Reference is now made to FIGS. 1 and 2, which show an example embodiment of a spoiler 10 according to the invention.

The motor vehicle spoiler 10 according to the invention is designed to be arranged in a region of a rear edge of the roof 20 above a rear window 30. The spoiler can thus be attached to the roof, or carried on the tailgate.

The spoiler 10 has an upper surface 12 and a lower surface 14 (see FIG. 2). The upper surface 12 is preferably substantially aligned with an imaginary continuation of the flow path from the roof, for reasons relating to aerodynamics and/or style.

The spoiler 10 has an upstream portion that is designed to be attached to the vehicle and a downstream portion forming a projection above the rear window 30. The concepts of upstream and downstream relate to the flow of air over the upper surface of the spoiler when the vehicle is moving forwards.

The spoiler 10 has at least one through-opening 40, i.e. an opening linking the upper and lower surfaces 12 and 14.

"Opening" means a channel having an inlet and an outlet in the thickness (Z) of the spoiler. Thus, the air coming from the roof passively enters the inlet of the channel, then flows through the channel, and finally leaves the channel through the outlet thereof, opposite the rear window. The channel therefore has walls, referred to as inner walls.

Figure 4A:
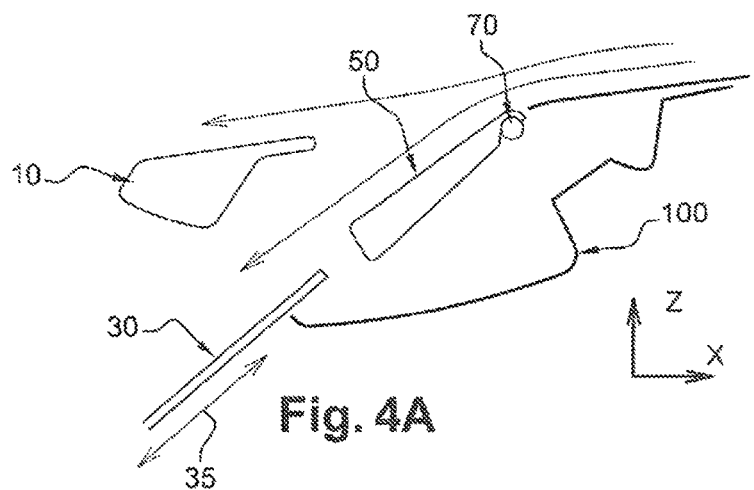
FIGS. 4A to 4C show the different positions of the movable wall of a spoiler according to the invention.

The opening 40 is positioned so as to open above a region of the rear window 30, i.e. a portion of the air coming from the roof 20 and entering this opening 40 is discharged onto a region 35 of the rear window (see FIG. 4A). This region 35 is preferably substantially the rear-view region of the vehicle, which is therefore the region to be cleaned. "Rear view" means the field of vision of the driver when looking behind the vehicle through the rear window 30.

The opening 40 has inner walls designed to channel (passively direct) the air entering the opening 40 onto the region 35 of the rear window in order to clean the latter, notably by directing an air flow to evacuate the water or other impurities from the surface of the rear window 30. The air diverted from the main flow thus passes onto the rear window 30 at least in the rear-view region 35 of the vehicle. Consequently, dirt (rain, mud, dust, leaves, snow, etc.) is blown away from the rear window.

According to the invention, at least one of the walls is mounted movably in relation to the spoiler 10 such that same can be opened downwards, i.e. towards the rear window 30, to channel the air flow onto the region 35, and such that the opening 40 can be closed off in a closed position.

Figure 3:
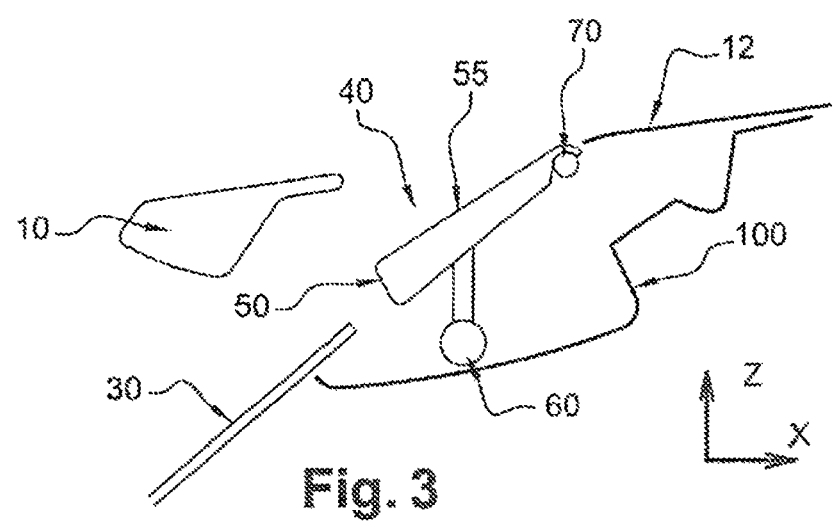
FIG. 3 is a diagram of a section (Y0) of a spoiler according to the invention with the movable wall and actuating means thereof.

Advantageously, this movable wall 50 is designed to close off the opening 40 such that the upper surface 55 (see FIG. 3) of this movable wall is flush (neither projecting nor recessed) with the upper surface 12 of the spoiler 10.

Advantageously, in the closed position, the movable wall 50 is substantially aligned with an imaginary continuation of the flow path from the roof. This arrangement is esthetically beneficial on account of the opening 40 being concealed, thereby giving the roof the appearance of continuity. Furthermore, this arrangement helps to stop the rain and dirt reaching the rear window, unlike solutions in the prior art.

The movable wall 50 is moved by actuating means 60. Preferably, the actuating means 60 are located beneath the upper surface 12 of the spoiler 10.

Thus, the actuating means 60 do not project from the upper surface 12, and as such do not disturb the air flow coming from the roof before passing over the upper surface 12 of the spoiler 10.

FIG. 1 shows an example embodiment in which the spoiler 10 is a roof or tailgate spoiler for a motor vehicle. In this example, the spoiler 10 has a single opening 40 extending across substantially the entire width of the spoiler 10. The width of the spoiler is the dimension along the axis Y of the vehicle, i.e. across the width of the vehicle.

According to this example, the movable wall 50 is mounted in rotation about an axis 70 that is oriented transversally in relation to the vehicle (see FIGS. 3 and 4A to 4C).

Figure 4B:
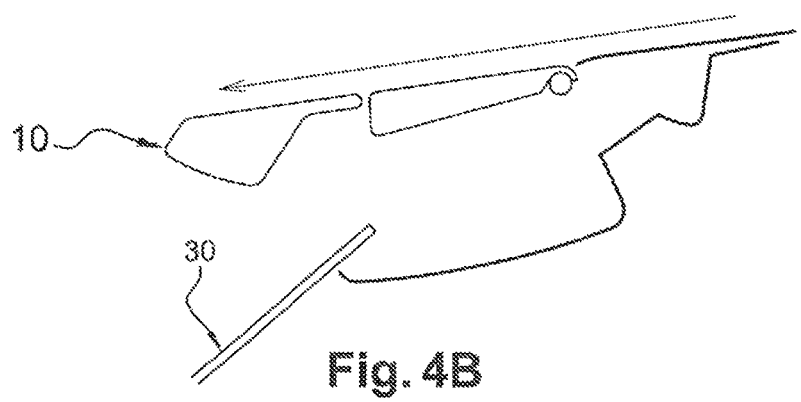

As shown in FIGS. 4A and 4B, in which the air flow is indicated using arrows, the movable wall 50 thus has at least two positions:

- an open position (FIG. 4A) in which the movable wall is oriented towards the rear window, with an orientation enabling the air passing through the opening 40 to be directed onto the region 35 of the rear window 30;
- a closed position (FIG. 4B) in which the movable wall is oriented substantially parallel to the upper surface 55 of the spoiler, while being flush with said surface. In this closed position, the movable wall prevents the air from passing through the opening without affecting the air flow coming from the roof before passing over the upper surface 12 of the spoiler 10.

Preferably, the axis 70 is located towards the upstream portion of the spoiler 10, i.e. towards the front of the vehicle when the spoiler 10 is mounted on the vehicle. The axis 70 is preferably located in the first half (along the axis X of the vehicle) of the spoiler 10. The axis of rotation 70 is therefore located upstream of the opening 40 so as to enable a downward pivoting of the movable wall 50 that opens or closes the opening 40, without any portion of the movable wall projecting from the upper surface 12 of the spoiler 10.

The movable wall 50 is moved by actuating means 60. These actuating means 60 enable the movable wall 50 to be pivoted about the axis of rotation 70 on which the movable wall 50 is mounted.

Preferably, the actuating means 60 and the axis of rotation are located beneath the upper surface 12 of the spoiler 10. Thus, neither the actuating means 60, nor the axis of rotation 70, nor the movable wall 50, even when in the closed position, project from the upper surface 12, and as such do not disturb the air flow coming from the roof and passing over the upper surface 12 of the spoiler 10. The aerodynamic and acoustic performance of the spoiler 10 is therefore perfectly maintained in this closed position.

According to one embodiment, the spoiler 10 has several openings 40. According to this embodiment, the openings are preferably aligned along a transverse axis of the vehicle. The walls of each opening cooperate to direct the air coming from the roof towards the region of the rear window 30. Preferably, each opening 40 is provided with a movable wall 50.

Figure 4C:
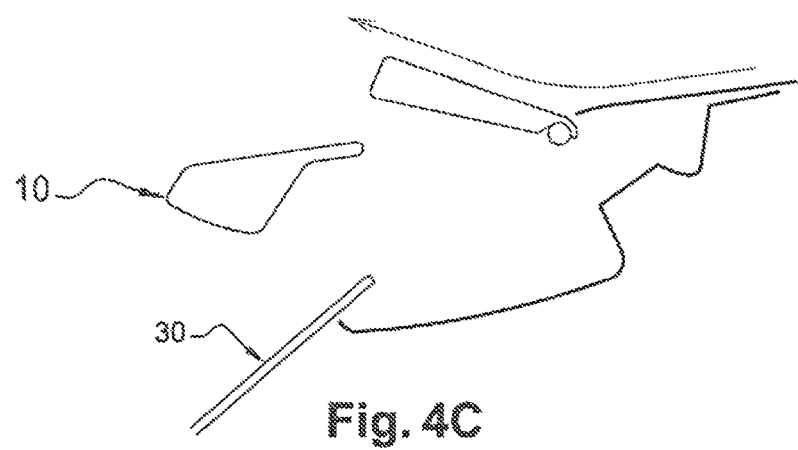

According to one embodiment (FIG. 4C), the movable wall 50 also has a position raised in relation to the aligned closed position. In this layout, the axis 70 is advantageously positioned upstream of the opening 40. In FIG. 4C, the air flow is indicated by an arrow.

The movable wall 50 then forms a wall projecting from the upper surface 12 of the spoiler 10. This projecting wall forms an inclined plane, the downstream portion of the wall being higher than the upstream portion (unlike in the open (lowered) position of the wall). The wall then directs the air flowing along the roof of the vehicle upwards, in order to increase aerodynamic support.

Thus, in rainy conditions, the actuating means 60 move the movable wall to the open position so as to create the through-opening 40 and to allow a portion of the air coming from the roof to flow towards a region of the rear window 30 to be cleaned, to evacuate the rain water, dust, snow and other impurities from the rear window 30.

In dry conditions (with no water on the rear window) and at low speeds (less than 100 km/h), the actuating means 60 move the movable wall to the closed position so as to close the opening 40 to obviate acoustic and aerodynamic disturbances.

In dry conditions (with no water on the rear window) and at high speeds (greater than 100 km/h), the actuating means 60 move the movable wall to the raised position so as to orient the movable wall 50 to an upward inclined plane, in order to increase aerodynamic support.

According to an embodiment that is not shown, the motor vehicle spoiler 10 extends laterally in relation to the vehicle bodywork, across the width of the vehicle, and includes:
a fascia providing the spoiler with an external appearance, and projecting towards the rear of the vehicle; and
a strengthening element (portion of the roof or of the tailgate) for the fascia that is attached to the fascia, including attachment means to the roof or to the tailgate 100.

A box-shaped seat is formed between the strengthening element and the spoiler 10, when the spoiler 10 is mounted on the vehicle. This seat can receive technical equipment, notably and preferably the actuating means 60.

The fascia is preferably made of thermoplastic material. The strengthening element can be made of thermosetting material or thermoplastic material.

The invention is not limited to the embodiments disclosed and other embodiments will be clear to the person skilled in the art. It is notably possible, according to one embodiment, for the movable wall 50 of the spoiler 10 not to be a wall of the opening 40. In such an embodiment, the movable wall may be a wall that is substantially parallel to the upper surface 12 of the spoiler, that is seated between the upper and lower surfaces 12 and 14, and that is moved by a substantially translational movement.

The invention claimed is:

1. A motor vehicle spoiler designed to be positioned in a region of a rear edge of a roof above a rear window, said spoiler comprising an upper surface substantially aligned with an imaginary continuation of an air flow path from the roof, and at least one through-opening that opens above a region of the rear window, said opening having at least one inner wall designed to channel an air flow coming from the roof onto the region through the opening, wherein said at least one inner wall is mounted moveably in relation to the motor vehicle spoiler so that said at least one inner wall can be opened towards the rear window to channel the air flow onto the region and so that the opening can be closed off in a closed position.

2. The spoiler according to claim 1, in which the movable wall is designed to close off the opening such that an upper surface of the movable wall is flush with the upper surface of the spoiler.

3. The spoiler according to claim 1, including actuating device which moves the movable wall, said actuating device being positioned beneath the upper surface of the spoiler.

4. The spoiler according to claim 1, wherein the movable wall is mounted moveably in rotation about an axis oriented transversely in relation to the vehicle when the spoiler is mounted on the vehicle.

5. The spoiler according to claim 4, in which the actuating device and the axis of rotation are located beneath the upper surface of the spoiler.

6. The spoiler according to claim 4, in which the axis of rotation is located upstream of the opening so as to enable a pivoting of the movable wall that opens or closes the opening, without the movable wall projecting from the upper surface of the spoiler.

7. The spoiler according to claim 6, in which the movable wall is designed to pivot about the axis between at least two positions:
an open position in which the movable wall is oriented towards the rear window, with an orientation enabling the air passing through the opening to be directed onto the region of the rear window;
a closed position in which the movable wall closes the opening, being substantially aligned with an imaginary continuation of the flow path from the roof and flush with the upper surface of the spoiler.

8. The spoiler according to claim 7, in which the movable wall has a position raised in relation to the closed position, in which the movable wall forms an inclined plane projecting from the upper surface of the spoiler, a downstream portion of the wall being higher than an upstream portion.

9. The spoiler according to claim 1, in which the region is the rear-view region of the vehicle.

10. The spoiler according to claim 1, including several openings.

11. The spoiler according to claim 5, in which the axis of rotation is located upstream of the opening so as to enable a pivoting of the movable wall that opens or closes the opening, without the movable wall projecting from the upper surface of the spoiler.

\* \* \* \* \*

UNITED STATES PATENT AND TRADEMARK OFFICE
CERTIFICATE OF CORRECTION

PATENT NO. : 10,604,198 B2  
APPLICATION NO. : 15/760142  
DATED : March 31, 2020  
INVENTOR(S) : Arnaud Escoffier et al.

Page 1 of 1

It is certified that error appears in the above-identified patent and that said Letters Patent is hereby corrected as shown below:

On the Title Page

Item (71), Line 1:  
"Compagnie Plastic Omnium, Lyons"  
Should be changed to:  
-- Compagnie Plastic Omnium, Lyon --

Item (72), Line 1:  
"Arnaud Escoffier, Lyons:"  
Should be changed to:  
-- Arnaud Escoffier, Lyon --

Signed and Sealed this  
Second Day of June, 2020

Andrei Iancu  
*Director of the United States Patent and Trademark Office*